(12) United States Patent
Tanner

(10) Patent No.: US 8,077,420 B2
(45) Date of Patent: Dec. 13, 2011

(54) METHOD AND APPARATUS FOR ADAPTIVE CONTROL AND/OR USE OF A VIBRATION SENSOR IN A HARD DISK DRIVE

(75) Inventor: Brian K. Tanner, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 12/152,449

(22) Filed: May 12, 2008

(65) Prior Publication Data
US 2009/0279198 A1 Nov. 12, 2009

(51) Int. Cl.
*G11B 15/18* (2006.01)
*G11B 21/02* (2006.01)

(52) U.S. Cl. .......................................... 360/71; 360/75
(58) Field of Classification Search .................... None
See application file for complete search history.

(56) References Cited

U.S. PATENT DOCUMENTS

| | | | | |
|---|---|---|---|---|
| 5,426,545 A | * | 6/1995 | Sidman et al. | 360/78.09 |
| 5,521,772 A | * | 5/1996 | Lee et al. | 360/75 |
| 5,745,066 A | * | 4/1998 | Hirooka et al. | 341/155 |
| 6,031,317 A | * | 2/2000 | Chen | 310/329 |
| 6,721,122 B2 | * | 4/2004 | Aikawa et al. | 360/77.02 |
| 7,035,034 B2 | * | 4/2006 | Semba et al. | 360/75 |

OTHER PUBLICATIONS

Analog Dialogue vol. 3, # 8, Sep. 1999 by Brian Black.*
ADC08D1000, Apr. 16, 2009, National Semiconductor.*
DDC112, Jan. 2000, Texas Instruments.*
ThS0842, Dec. 1999, Texas Instruments.*

* cited by examiner

Primary Examiner — K. Wong

(57) ABSTRACT

Apparatus and methods are disclosed for adaptive control and/or use of a vibration sensor in a hard disk drive (HDD). The HDD, an assembled circuit board and a control circuit are disclosed. The control circuit is configured to electrically couple to piezoelectric devices and includes a sensor interface and a processor. The processor may be configured to receive a sensor reading from the sensor interface and may further be configured to send a gain control signal and/or an input selection signal to the sensor interface. The sensor interface includes pads for electrically coupling to the piezoelectric devices. The sensor interface may respond to the gain control signal by altering a gain of a signal from one pad used and/or may respond to the input selection signal in certain states by disabling one of these signals from affecting the sensor reading. Manufacturing by calibration of the gain control is disclosed.

17 Claims, 3 Drawing Sheets

Fig. 2
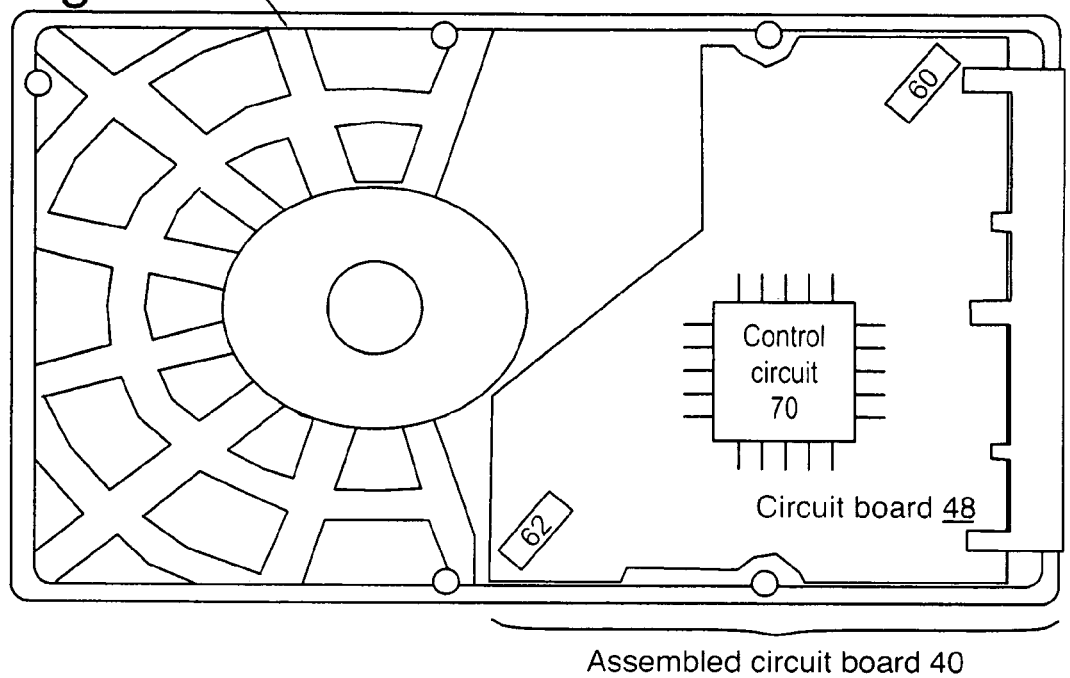
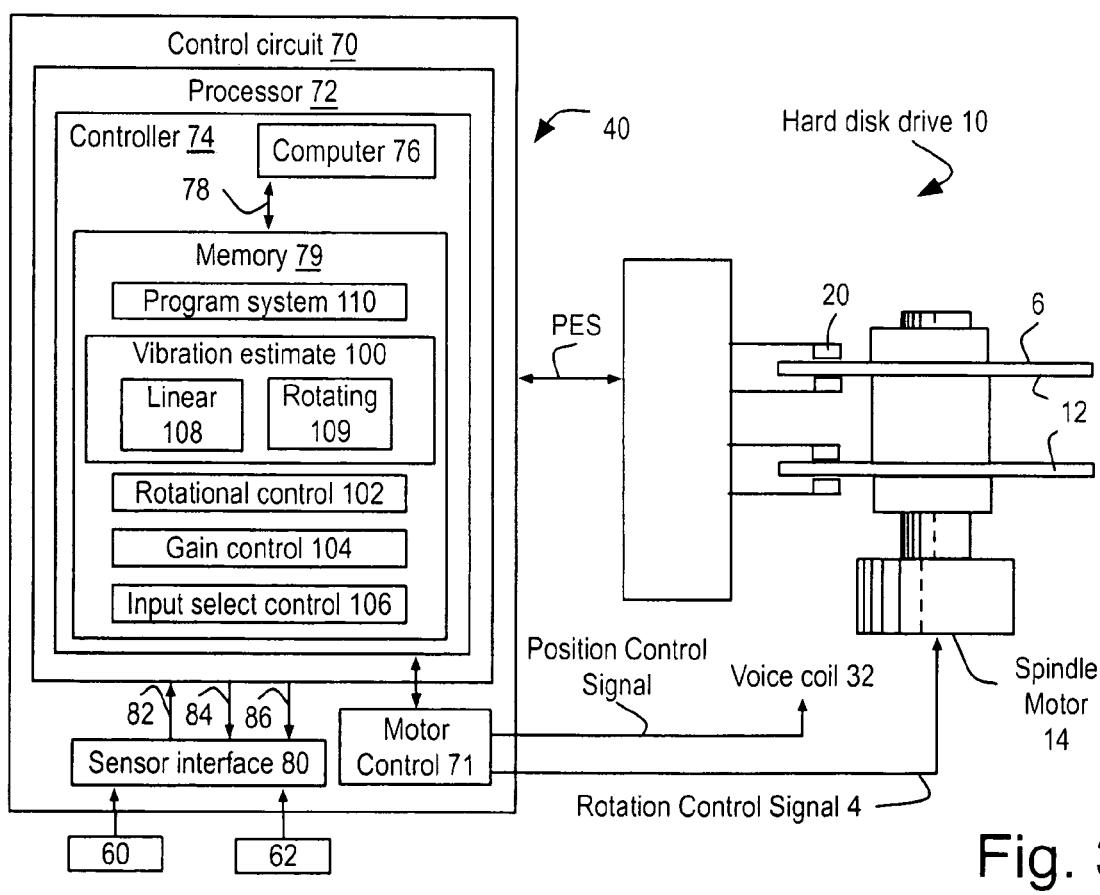
Fig. 3

Fig. 4
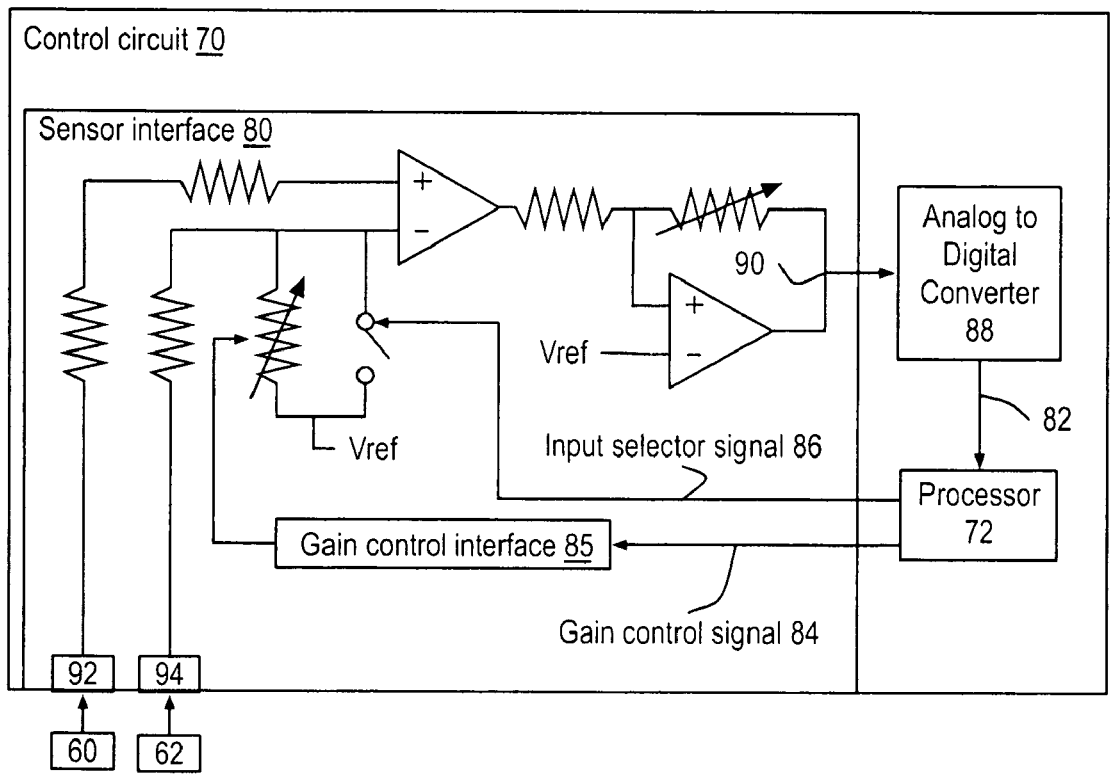
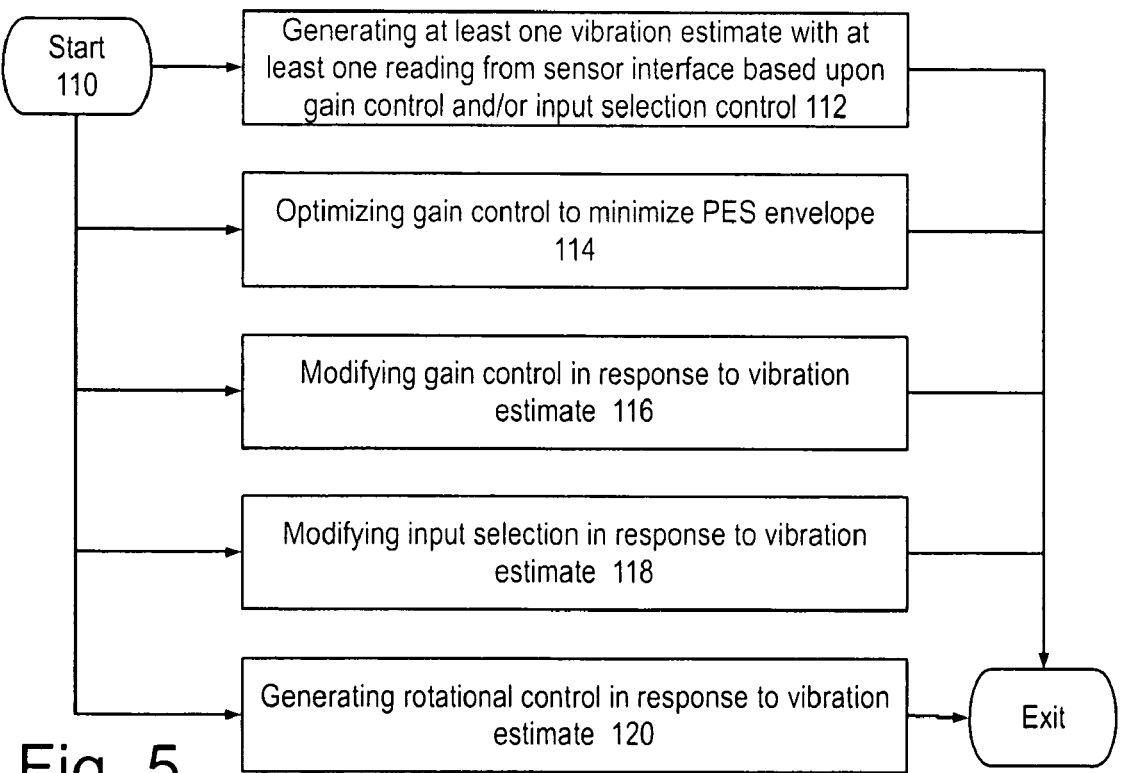
Fig. 5

METHOD AND APPARATUS FOR ADAPTIVE CONTROL AND/OR USE OF A VIBRATION SENSOR IN A HARD DISK DRIVE

TECHNICAL FIELD

This invention relates to vibration sensors in hard disk drives.

BACKGROUND OF THE INVENTION

Hard disk drives have been found sensitive to mechanical vibration in the plane of the rotating disks, known herein as rotational vibration. While vibration sensors have been implemented in the prior art, they have not been very flexible in use. They are subject to aging, temperature, humidity and the manufacturing process itself, all of which affect the sensor accuracy in measuring vibration. What is needed is a more flexible approach to measuring vibration which can adjust to changes in aging vibration sensors.

SUMMARY OF THE INVENTION

Embodiments of the invention include a hard disk drive including an assembled circuit board comprising a control circuit configured to electrically couple to at least two piezoelectric devices and including a sensor interface and a processor. The processor may be configured to receive a sensor reading from the sensor interface and to create a vibration estimate in response to the sensor reading. The processor may further be configured to send a gain control signal and/or an input selection signal to the sensor interface. The sensor interface includes pads for electrically coupling to the piezoelectric devices. The sensor interface may respond to the gain control signal by altering a gain of a signal from the second pad used to create the sensor reading. The sensor interface may respond to the input selection signal in certain states by disabling this signal from affecting the sensor reading. Isolating the signals and controlling their relative gain can increase the flexibility of the sensor and the accuracy of the vibration estimates.

Embodiments of the invention may include operating the hard disk drive and/or the control circuit by generating at least one vibration estimate in response to the sensor interface receiving the gain control signal and/or the input selection signal. Operations also include optimizing a gain control to minimize a statistical envelope of a Position Error Signal (PES) derived from a slider following a track on a rotating disk surface rotated by a spindle motor stimulated by the control circuit. This optimization may be done on an assembled hard disk drive as an initial calibration and/or it may be performed later to recalibrate the hard disk drive to account for the aging of the piezoelectric devices, temperature, humidity or other conditions.

BRIEF DESCRIPTION OF THE DRAWINGS

FIG. 2 shows a back view of the hard disk drive with some details of the opposite side of the disk base and the assembled circuit board of FIG. 1. The assembled circuit board may include piezoelectric devices and a control circuit mechanically and electrically coupled to a circuit board.

FIG. 3 shows a simplified schematic of a preferred embodiment of the electrical circuitry in the hard disk drive where the control circuit may stimulate the spindle motor in response to a vibration estimate. The control circuit includes at least one processor and a sensor interface. The processor may receive a digital reading from a sensor interface electrically coupled to the piezoelectric devices, and may be configured to assert a gain control signal and/or assert an input selector control signal to control the operation of the sensor interface. The processor may include a controller that may further include a computer accessibly coupled via a buss to a computer readable memory including a program system to instruct the computer and direct the hard disk drive in its operations by implementing the methods of various embodiments of the invention.

FIG. 4 shows an example of a preferred embodiment of the control circuit and the sensor interface, where an analog to digital converter may receive a conditioned signal based upon at least one of the electrical conditions of a first pad and a second pad configured to electrically couple to the first piezoelectric device and the second piezoelectric device, respectively. The analog to digital converter may send a digital reading to the processor in response to receiving the conditioned signal. The processor may assert the gain control signal and/or assert the input selector signal to the sensor interface that individually or collectively affect an input to the sensor interface, for example the second input, which is associated with the second pad.

FIG. 5 shows as a flowchart some details of the program system of FIG. 3 that may be used in various embodiments using one or more of the program steps shown as examples of various steps in the invention's manufacture, recalibration and operation processes. At least one vibration estimate may be generated with at last one reading from the sensor interface based upon the gain control, and consequently the gain control signal, and/or the input selection control. The gain control may be optimized to minimize a statistical envelope of the Position Error Signal (PES). The gain control and/or the input selection control may be modified in response to the vibration estimate. The rotation control, and consequently the rotational control signal that drives the spindle motor, may be modified in response to the vibration estimate.

DETAILED DESCRIPTION

Figure 1:
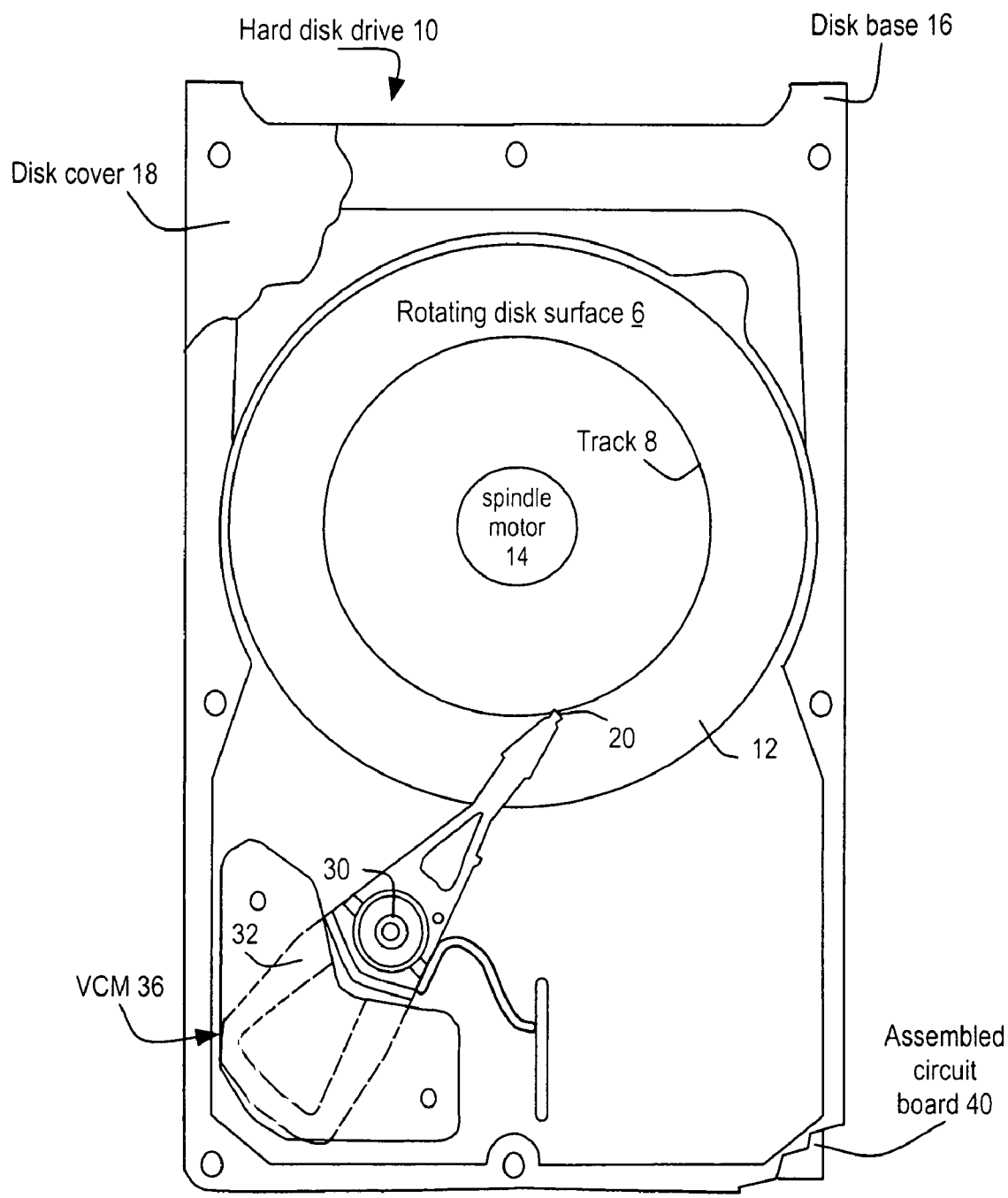
FIG. 1 shows a cutaway view of an example of an embodiment of the invention as a hard disk drive including a disk base to which a spindle motor is mounted with at least one disk rotatably coupled to the spindle motor to form the rotational plane of the disks. An assembled circuit board is coupled to the opposite side of the disk base from the spindle motor. The assembled circuit board may preferably stimulate the spindle motor in response to an estimate of vibration affecting the hard disk drive. Rotational vibration will refer vibration parallel to the rotational plane. Linear vibration will refer to vibration perpendicular to the rotational plane.

This invention relates to apparatus and methods for adaptive control and/or use of a vibration sensor in a hard disk drive. Embodiments of the invention may provide means for adjusting to changes experienced by vibration sensors over time, improving the accuracy of such sensors. Embodiments of the invention include a hard disk drive including an assembled circuit board comprising a control circuit configured to electrically couple to at least two piezoelectric devices and including a sensor interface and a processor. The processor may be configured to receive a sensor reading from the sensor interface and to create a vibration estimate in response to the sensor reading. The processor may further be configured to send a gain control signal and/or an input selection signal to the sensor interface. The sensor interface includes pads for electrically coupling to the piezoelectric devices.

The sensor interface may respond to the gain control signal by altering a gain of a signal from the second pad used to create the sensor reading. The sensor interface may respond to the input selection signal in certain states by disabling this signal from affecting the sensor reading. Isolating the signals and controlling their relative gain can increase the flexibility of the sensor and the accuracy of the vibration estimates.

Referring to the drawings more particularly by reference numbers, FIG. 1 shows a cutaway view of an example of an embodiment of the invention as a hard disk drive 10 including a disk base 16 to which a spindle motor 14 is mounted. At least one disk 12 is rotatably coupled to a spindle motor to rotate the disks, forming the rotational plane of the disks and the rotating disk surface 6. An assembled circuit board 40 is coupled to the opposite side of the disk base from the spindle motor. The assembled circuit board may preferably stimulate the spindle motor in response to an estimation of vibration affecting the hard disk drive. Rotational vibration will refer vibration parallel to the rotational plane. Linear vibration will refer to vibration perpendicular to the rotational plane.

A voice coil motor 36 is pivotably mounted by an actuator pivot 30 to the disk base 16. The voice coil motor is configured to position a slider 20 over the rotating disk surface 6 of the disk in response to the interaction of a voice coil 32 and a fixed magnetic assembly 34. Frequently, the slider is positioned near a track 8 of the rotating disk surface to support access operations such as reading and/or writing the track. A disk cover 18 is mounted on the disk base when the voice coil motor and spindle motor with its disks have been assembled and configured, to encapsulate these components.

FIG. 2 shows a back view of the hard disk drive 10 with some details of the opposite side of the disk base 16 and the assembled circuit board 40 of FIG. 1. The assembled circuit board may include piezoelectric devices 60 and 62 and a control circuit 70 mechanically and electrically coupled to a circuit board 48. The control circuit may preferably be implemented as an integrated circuit and/or housed in a multi-chip module package similar to an integrated circuit. In certain alternative embodiments, the piezoelectric devices may be mounted on the disk base 16 on the opposite side from the assembled circuit board, possibly near the voice coil motor 36. In either case, the piezoelectric devices are preferably electrically coupled to the control circuit, which is shown in the following Figure.

FIG. 3 shows a simplified schematic of a preferred embodiment of the electrical circuitry in the hard disk drive 10 where the control circuit 70 may drive a rotational control signal 4 to stimulate the spindle motor 14 in response to a vibration estimate 100. The control circuit may preferably include at least one processor 72 and a sensor interface 80. The spindle motor may be stimulated by a rotational control signal generated by a motor control circuit within the control circuit that may be directed by the processor based upon a rotational control 102. The processor may receive a digital reading 82 from the sensor interface electrically coupled to the piezoelectric devices 60 and 62, and may be configured to assert a gain control signal 84 and/or assert an input selector control signal 86 to control the operation of the sensor interface.

The processor 72 may include a controller 74. As used herein a controller receives at least one input, maintains/updates at least one state, and generates at least one output based upon the value of at least one of the inputs and/or at least one of the states. Various embodiments of the invention may implement a controller as a finite state machine and/or a computer. For example, the controller may further include the computer 76 accessibly coupled 78 via a buss to a computer readable memory 79 including a program system 110 to instruct the computer and direct the hard disk drive 10 in its operations implementing various of the invention's method embodiments. As used herein a computer includes at least one data processor and at least one instruction processor, with at least one of the instruction processors instructed by the program system, and each of the data processors is instructed by at least one of the instruction processors.

The processor 72 may include a vibration estimate 100 of the hard disk drive 10 based upon at least one reading 82 received from the sensor interface 80. The processor may use the vibration estimate to at least partly generate a rotational control value 102 used to direct the generation of the rotational control signal 4 configured to stimulate the spindle motor 14 to rotate the disks 12. The vibration estimate may include a linear vibration estimate 108 and/or a rotational vibration estimate 109. Preferably, the vibration estimate includes both of these estimates.

The motor control circuit may further generate a position control signal used to stimulate the voice coil 32, which may be at least partly generated from a Position Error Signal (PES) derived from signals received from the slider 20 when it is following a track 8 on the rotating disk surface 6 as shown in FIG. 1.

FIG. 4 shows an example of a preferred embodiment of the control circuit 70 and the sensor interface 80, where an analog to digital converter 88 may receive a conditioned signal 90 based upon at least one of the electrical conditions of a first pad 92 and a second pad 94 configured to electrically couple to the first piezoelectric device 60 and the second piezoelectric device 62, respectively. The analog to digital converter may assert the digital reading 82 to the processor 72 in response to receiving a version of the conditioned signal. The analog to digital converter in some embodiments may be shared with other analog circuits in the control circuit. Alternatively, the analog to digital converter may be included in the sensor interface.

The processor 72 may assert the gain control signal 84 and/or assert the input selector signal 86 to the sensor interface 80 that individually or collectively affect an input to the sensor interface, for example the second input signal associated with the second pad 94. The gain control signal may be received by a gain control interface 85, which may include a digital to analog converter receiving a digital version of the gain control signal to create an analog condition affecting the gain of the second input.

Some of the following figures show flowcharts of at least one embodiment of the method, which may include arrows signifying a flow of control, and sometimes data, supporting various implementations of the method. These include a program operation, or program thread, executing upon the computer 76, and/or a state transition in the finite state machine. The operation of starting a flowchart refers entering a subroutine or a macro instruction sequence in the computer, and/or directing a state transition in the finite state machine, possibly while pushing a return state. The operation of termination in a flowchart refers completion of those operations, which may result in a subroutine return in the computer, and/or popping of a previously stored state in the finite state machine. The operation of terminating a flowchart is denoted by an oval with the word "Exit" in it.

FIG. 5 shows as a flowchart some details of the program system 110 of FIG. 3 that may be used in various embodiments using one or more of the program steps shown as examples of various steps in the invention's manufacture, recalibration and operation processes. At least one vibration estimate 100 may be generated 112 with at last one reading 82 from the sensor interface 80 based upon the gain control 104, and consequently the gain control signal 82, and/or the input selection control 106, consequently, the input selection signal 86. The gain control may be optimized to minimize a statistical envelope of the Position Error Signal (PES). The gain control and/or the input selection control may be modified in response to the vibration estimate. The rotation control 102, and consequently the rotational control signal 4 that drives the spindle motor, may be modified in response to the vibration estimate. The program system may include any combination of one or more of the following program steps discussed in the next paragraphs.

Program step 112 supports generating at least one vibration estimate 100 with at least one reading 82 from the sensor interface 80 and based upon the gain control 104 and/or the input selection 106. The gain control 104 may preferably be used to assert the gain control signal 84. The input selection 106 may preferably be used to assert the input selection control signal 86. The vibration estimate may include a linear vibration estimate and/or a rotational vibration estimate, and preferably includes both.

Program step 114 supports optimizing the gain control 104 to minimize the statistical envelope of the Position Error Signal (PES) when following the track 8. This program step is preferably used at least once after assembling the hard disk drive 10 to calibrate the sensor interface 80 in its actual electrical coupling to the piezoelectric devices 60 and 62. In certain embodiments, program step 112 may also be used to recalibrate these components to assess the effects of aging, heat, air pressure and/or humidity upon the hard disk drive. In certain embodiments of the invention, this optimization may take into account the PES envelope in certain frequency bands.

Program step 116 supports modifying the gain control 104 in response to the vibration estimate 100. In certain preferred embodiments, the modifying program step may further be based upon the linear vibration estimate and/or the rotational vibration estimate, and preferably based upon both estimates. The modifying program step may further include modifying the gain control based upon the linear vibration estimate and the rotational vibration estimate in at least two frequency bands.

Program step 118 supports optimizing the input selection 106 in response to the vibration estimate 100. In certain preferred embodiments, the modifying program step may further be based upon the linear vibration estimate 108 and/or the rotational vibration estimate 109, and preferably based upon both estimates. The modifying program step may further include modifying the input selection based upon the linear vibration estimate and the rotational vibration estimate in at least two frequency bands. In particular, it may be preferred to set the input selection so that the second input signal from the second pad 94 is turned off in response in response to the hard disk drive 10 experiencing vibration that is predominantly a linear vibration. Similarly, the input selection may be modified so that the second input signal is enabled in response the hard disk drive experiencing rotational vibration. Program steps 116 and 118 may be used together to optimally reduce the PES envelope in response to a linear vibration event to restrict the sensor input to a single input, turning off updating the gain control 104 which might otherwise be degraded due to lack of signal amplitude.

Program step 120 supports generating the rotational control 102 is response to the vibration estimate 100. This program step may further generate the rotational control in response to the linear vibration estimate and/or the rotational vibration estimate, and preferably in response to both vibration estimates. The rotation control may be further modified in response to spectral analyses of the vibration estimate and/or its linear and rotational vibration estimates.

The preceding embodiments provide examples of the invention, and are not meant to constrain the scope of the following claims.

What is claimed is:

1. A hard disk drive, comprising:
   a disk base; and
   an assembled circuit board mounted on said disk base, said assembled circuit board comprising a control circuit electrically coupled to at least two piezoelectric devices, said control circuit comprising a sensor interface, an Analog to Digital Converter (ADC) and a processor,
   said processor for receiving a sensor reading via said ADC from said sensor interface and further for sending a gain control signal to said sensor interface,
   said sensor interface including pads electrically coupled to said piezoelectric devices, and
   said sensor interface for responding to said gain control signal by altering a gain of a signal from one of said pads used to create said sensor reading.

2. The hard disk drive of claim 1, wherein said processor is further for sending an input selection signal to said sensor interface, and said sensor interface is further for responding to said input selection signal in a disabling state by disabling said signal from said one of said pads from affecting said sensor reading.

3. The hard disk drive of claim 1, wherein said assembled circuit board includes said piezoelectric devices.

4. The hard disk drive of claim 1, wherein said processor includes at least one controller comprising a computer accessibly coupled to a computer readable memory and instructed by a program system including program steps residing in said computer readable memory.

5. The hard disk drive of claim 4, wherein the program system comprises the program step of:
   generating at least one vibration estimate with at least one of said sensor readings from said sensor interface based upon said gain control.

6. The hard disk drive of claim 4, wherein the program system comprises the program step of:
   optimizing said gain control to minimize a statistical envelope of a Position Error Signal (PES) derived from said slider following a track on a rotating disk surface rotated by a spindle motor.

7. The hard disk drive of claim 4, wherein the program system comprises the program step of:
   modifying said gain control in response to said vibration estimate.

8. The hard disk drive of claim 4, wherein the program system comprises the program step of:
   generating said rotational control signal based upon said vibration estimate.

9. A method of manufacturing a hard disk drive,
   wherein said hard disk drive comprises
   a disk base; and
   an assembled circuit board mounted on said disk base, said assembled circuit board comprising a control circuit electrically coupled to at least two piezoelectric devices, said control circuit comprising a sensor interface, an Analog to Digital Converter (ADC) and a processor,
   said processor for receiving a sensor reading via said ADC from said sensor interface and further for sending a gain control signal to said sensor interface,
   said sensor interface including pads electrically coupled to said piezoelectric devices, and said sensor interface for responding to said gain control signal by altering a gain of a signal from one of said pads used to create said sensor reading, wherein said method comprising the steps of:

optimizing said gain control for use by said sensor interface electrically coupled to said at least two piezoelectric devices to minimize a statistical envelope of a Position Error Signal (PES) derived from a slider positioned near a track on a rotating disk surface included in an assembled hard disk drive to create said hard disk drive including said gain control.

10. A control circuit for use in a hard disk drive, comprising:

a processor configured to create a gain control signal;

a sensor interface for receiving said gain control signal and to receive signals from at least two piezoelectric devices to create a sensor reading via an Analog to Digital Converter (ADC), whereby said sensor interface responds to said gain control signal by setting a gain on one of said signals to create said sensor reading; and said processor for receiving said sensor reading.

11. A method of manufacturing a control circuit for use in a hard disk drive, comprising the steps:

providing a processor, a sensor interface, an Analog to Digital Converter (ADC), a sensor reading coupling from said sensor interface via said ADC to said processor and a gain control coupling from said processor to said sensor interface to create said control circuit;

wherein said sensor interface is for responding to a gain control signal delivered via said gain control coupling by altering a gain of a signal from a pad for electrically coupling to one of at least two piezoelectric devices used to create a sensor reading sent via said sensor reading coupling to said processor.

12. An assembled circuit board for use in a hard disk drive, comprising:

a control circuit configured to electrically couple to at least two piezoelectric devices, said control circuit comprising: a sensor interface an Analog to Digital Converter and a processor, said sensor interface comprising two pads for electrically coupling to said piezoelectric devices, said processor for receiving a sensor reading via said ADC from said sensor interface, said processor further for sending a gain control signal to said sensor interface, and said sensor interface for responding to said gain control signal by altering a gain of a signal from one of said pads used to create said sensor reading.

13. A hard disk drive, comprising:

a control circuit electrically coupled to at least two piezoelectric devices, said control circuit comprising: a sensor interface, an Analog to Digital Converter (ADC) and a processor, said sensor interface comprising two pads electrically coupled to said piezoelectric devices, said processor for receiving a sensor reading via said ADC from a sensor interface, said processor further for sending an input selection signal to said sensor interface, and said, sensor interface for responding to said input selection signal in a disabling state by disabling a signal from one of said pads affecting said sensor reading.

14. The hard disk drive of claim 13, wherein said processor includes at least one controller comprising a computer accessibly coupled to a computer readable memory and instructed by a program system including program steps residing in said computer readable memory.

15. The hard disk drive of claim 14, wherein the program system comprises the program step of:

generating at least one vibration estimate with at least one of said sensor readings from said sensor interface based upon said input selection signal.

16. The hard disk drive of claim 14, wherein the program system comprises the program step of:

modifying said input selection signal in response to said vibration estimate.

17. A control circuit for electrically coupling to at least two piezoelectric devices in a hard disk drive, said control circuit comprising: a sensor interface, an Analog to Digital Converter (ADC) and a processor, said sensor interface comprising two pads for electrical coupling to said piezoelectric devices, said processor for receiving a sensor reading via said ADC from a sensor interface, said processor further for sending an input selection signal to said sensor interface, and said sensor interface for responding to said input selection signal in a disabling state by disabling a signal from one of said pads affecting said sensor reading.

* * * * *